(12) United States Patent
Nader et al.

(10) Patent No.: US 6,601,382 B2
(45) Date of Patent: Aug. 5, 2003

(54) METHOD AND APPARATUS FOR DETERMINING A TEMPERATURE OF AN EMISSION CATALYST

(75) Inventors: David Robert Nader, Farmington Hills, MI (US); Frank Korpics, Belleville, MI (US); Michael Daniel Shane, Detroit, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/003,364

(22) Filed: Nov. 15, 2001

(65) Prior Publication Data

US 2003/0089099 A1 May 15, 2003

(51) Int. Cl.$^7$ ................................................. F01N 3/00
(52) U.S. Cl. .................... 60/274; 73/118.1; 374/144
(58) Field of Search ................. 60/274, 276, 277, 60/285; 73/118.1; 374/144, 147, 148, 45, 138

(56) References Cited

U.S. PATENT DOCUMENTS

| | | | |
|---|---|---|---|
| 4,656,829 A | | 4/1987 | Creps et al. |
| 5,303,168 A | | 4/1994 | Cullen et al. |
| 5,414,994 A | * | 5/1995 | Cullen et al. ................ 60/274 |
| 5,647,669 A | * | 7/1997 | Schnaibel et al. .......... 374/144 |
| 5,722,236 A | | 3/1998 | Cullen et al. |
| 5,802,843 A | * | 9/1998 | Kurihara et al. ............. 60/277 |
| 5,832,721 A | | 11/1998 | Cullen |
| 5,956,941 A | | 9/1999 | Cullen |
| 6,050,087 A | * | 4/2000 | Kurihara et al. ............. 60/274 |
| 6,286,305 B1 | * | 9/2001 | Poublon et al. .............. 60/274 |
| 6,295,806 B1 | * | 10/2001 | Poublon et al. .............. 60/274 |

* cited by examiner

Primary Examiner—Thomas Denion
Assistant Examiner—Tu M. Nguyen
(74) Attorney, Agent, or Firm—John F. Buckart; Allan J. Lippa

(57) ABSTRACT

A control system and method for controlling an engine (10) of an automotive vehicle having a catalyst (34) and controller (40) is set forth herein. The controller (40) is configured to determine a first exhaust flow rate and a second exhaust flow rate based on a flow rate of the exhaust gases. The controller is further configured to determine a first temperature (T1) of exhaust gases associated with the first exhaust flow rate based on a steady state temperature and an amount of heat transferred from the exhaust gases associated with the first exhaust flow rate to an exhaust system. The controller is further configured to determine a second temperature of exhaust gases associated with the second exhaust flow rate based on the steady state temperature. The controller is further configured to determine the catalytic converter temperature based on the first temperature and the second temperature.

25 Claims, 3 Drawing Sheets

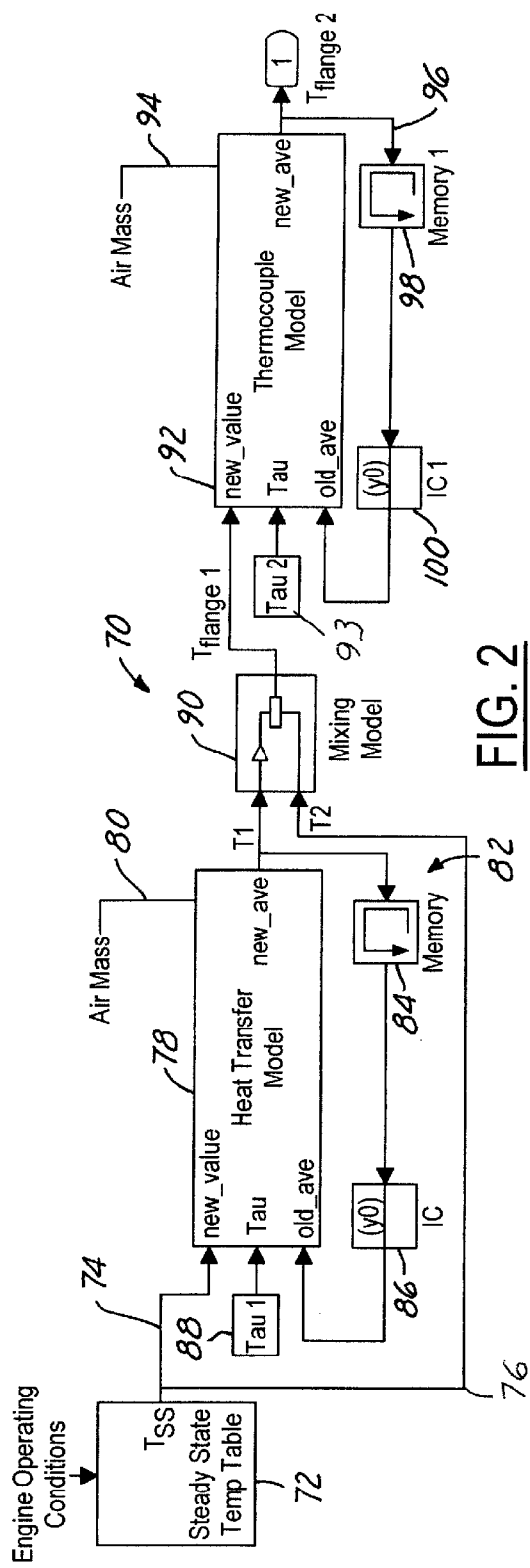
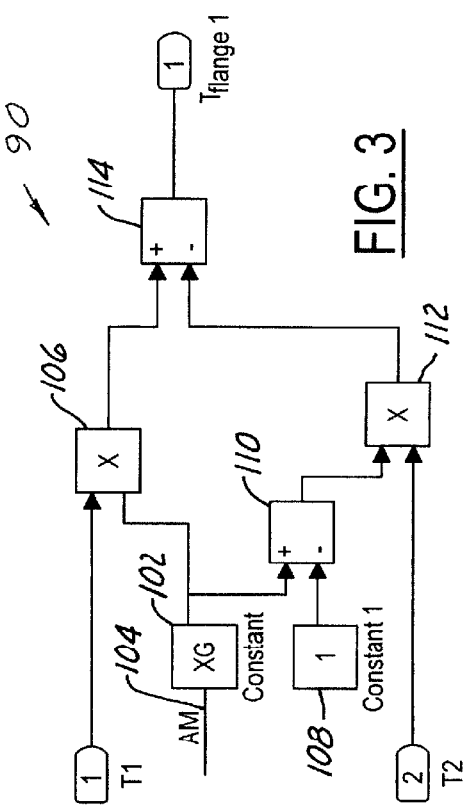
FIG. 2
FIG. 3

METHOD AND APPARATUS FOR DETERMINING A TEMPERATURE OF AN EMISSION CATALYST

TECHNICAL FIELD

The present invention relates generally to a control system for an internal combustion of an automotive vehicle, and more particularly, to a method and apparatus for predicting the exhaust gas temperature at a predetermined location of the exhaust system.

BACKGROUND

Minimizing tailpipe emission is an objective of closed loop fuel systems. Closed loop fuel systems include a catalytic converter that is used to treat the exhaust gas of an engine. Such converters operate to chemically alter the gas composition produced by the engine to help meet various environmental regulations governing tailpipe emissions. Determining the temperature of the catalytic converter is one feedback used in the control thereof.

The engine has an exhaust manifold that receives exhaust gases from the engine cylinders. The exhaust manifold routes the flow of exhaust gases into the exhaust system that includes the catalytic converter. The exhaust flange is the location where the exhaust manifold and exhaust system are joined. As is described in U.S. Pat. No. 5,956,941, which is incorporated by reference herein, the instantaneous temperature of the catalytic converter may be determined from the instantaneous temperature of the exhaust gas at the exhaust flange. The temperature of the catalyst is then provided to the engine controller to control the various engine operating parameters. It should also be noted that the flange temperature is also used to predict various other downstream predictions such as the front heated exhaust gas oxygen temperature, the catalyst inlet temperature, the catalyst midbed temperature, and the downstream heated exhaust gas oxygen sensor temperature.

It has been found that the exhaust flange temperature response exhibits second order behavior. That is, initially the measured temperature reacts at a fast rate with a zero to 20 second time constant and after that time, the rate slows considerably to a 50 to 250 second time constant. Known methods for determining the exhaust flange temperature do not take this into account and therefore may not be accurate at least over a portion of the temperature range.

Current catalyst temperature prediction algorithms are performed on an engine dynamometer with recalibration after the engine is placed into a vehicle during on road testing. Because the temperature determination may not be accurate as mentioned above, it has been found that about twenty percent of the dynamometer calibrations must be revised in on-road testing. This recalibration increases the cost and time of development.

It would therefore be desirable to provide a method and apparatus for more accurately determining the exhaust flange temperature.

SUMMARY OF THE INVENTION

The present invention provides a more accurate method and apparatus for determining the exhaust flange temperature over the operating range of the automotive vehicle.

In one aspect of the invention, a system for predicting the temperature of a catalyst including a control system and method for controlling an engine of an automotive vehicle having a catalyst and controller is set forth herein. The controller is configured to determine a first exhaust flow rate and a second exhaust flow rate based on a flow rate of the exhaust gases. The controller is further configured to determine a first temperature of exhaust gases associated with the first exhaust flow rate based on a steady state temperature and an amount of heat transferred from the exhaust gases associated with the first exhaust flow rate to an exhaust system. The controller is further configured to determine a second temperature of exhaust gases associated with the second exhaust flow rate based on the steady state temperature. The controller is further configured to determine the catalytic converter temperature based on the first temperature and the second temperature.

In a further aspect of the invention, a method for determining a temperature of an emission catalyst communicating with exhaust gases from an engine includes determining a first exhaust flow rate and a second exhaust flow rate based on a total flow of the exhaust gases, determining a first temperature of exhaust gases associated with the first exhaust flow rate based on a steady state temperature and an amount of heat transferred from the exhaust gases associated with the first exhaust flow rate to an exhaust system, determining a second temperature of exhaust gases associated with the second exhaust flow rate based on the steady state temperature, and determining the catalyst temperature based on the first temperature and the second temperature.

One advantage of the invention is that development time and cost of the engine is reduced because post-dynamometer calibration of the flange temperature may be significantly reduced or eliminated.

Other advantages and features of the present invention will become apparent when viewed in light of the detailed description of the preferred embodiment when taken in conjunction with the attached drawings and appended claims.

BRIEF DESCRIPTION OF THE DRAWINGS

FIG. 2 is a block diagrammatic view of the operation of flange temperature prediction control system according to the present invention.

FIG. 3 is a more detailed block diagrammatic view of the mixing model of FIG. 2.

DESCRIPTION OF THE PREFERRED EMBODIMENT

Figure 1:
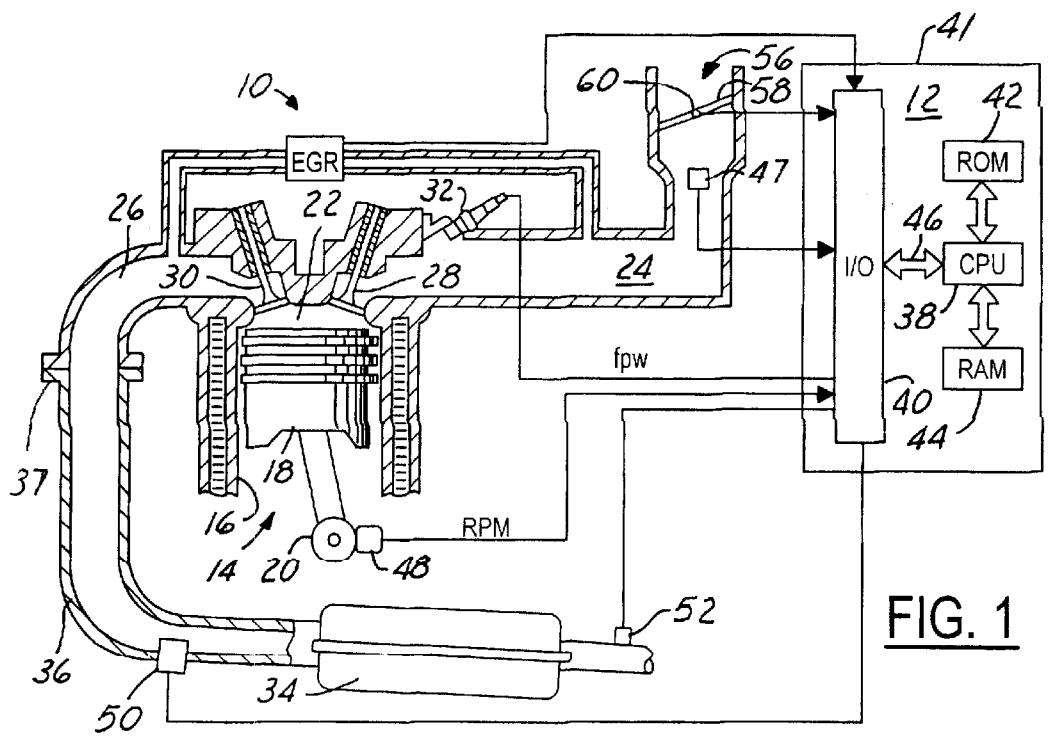
FIG. 1 is a schematic view of a motor vehicle internal combustion engine together with apparatus for controlling the engine in accordance with the preferred embodiment of the invention.

In the following example the same reference numerals and signal names will be used to identify the respective same components and the same electrical signals in the various views.

The present invention seeks to more accurately predict the exhaust gas temperature by taking into consideration its second order characteristic. The modeling may be performed using a thermocouple model so that verification may be performed using non-road tested data.

Referring now to FIG. 1, internal combustion engine 10 is controlled by electronic controller 12. Engine 10 has a plurality of cylinders 14, one of which is shown. Each cylinder has a cylinder wall 16 and a piston 18 positioned therein and connected to a crankshaft 20. A combustion chamber 22 is defined between piston 18 and cylinder wall 16. Combustion chamber 22 communicates between intake manifold 24 and exhaust manifold 26 via a respective intake valve 28 and an exhaust valve 30. Intake manifold 24 is also shown having fuel injector 32 coupled thereto for delivering liquid fuel in proportion to the pulse width of signal (FPW) from controller 12. The fuel quantity together with the amount of air mass in the intake manifold 24 defines the air/fuel ratio directed into combustion chamber 22. Those skilled in the art will also recognize that engine may be configured such that the fuel is injected directly into the cylinder of the engine in a direct injection type system.

A catalyst 34 is coupled to exhaust manifold 26 through exhaust system 36. Exhaust manifold 26 is coupled to exhaust system 36 at exhaust flange 37. Catalyst 34 is used to reduce tail pipe emissions by performing reduction and oxidation reactions with the combustion gasses leaving combustion chamber 22 through exhaust valve 30.

Controller 12 is shown as a conventional microcomputer 41 including a microprocessing unit (CPU) 38, input/output ports 40, a computer storage medium such as read-only memory 42 and random access memory 44, and a conventional data bus 46 therebetween. The computer storage medium has a computer program therein for controlling the CPU to determine the temperature at exhaust flange 37 as will be further described below. The computer storage medium has a calibrated table therein for determining the engine operating conditions at various engine operating conditions. The table may be determined during calibration on a dynamometer.

Controller 12 is shown receiving various signals from sensors coupled to engine 10. The various sensors may include a mass airflow sensor 47 used to provide an air mass signal to controller 12. An engine speed sensor 48 is used to generate an engine speed signal corresponding to the rotational speed of crankshaft 20. An exhaust gas oxygen sensor 50 positioned upstream of catalyst 34 provides a signal corresponding to the amount of oxygen in the exhaust gas prior to the catalyst. One suitable example of an exhaust gas oxygen sensor is a UEGO sensor. A second exhaust gas oxygen sensor 52 may be coupled to the exhaust system after catalyst 34. One suitable example of an UEGO sensor downstream of catalyst 34 is a heated exhaust gas oxygen sensor.

A throttle body 56 having a throttle plate 58 and a throttle position sensor 60 is illustrated. Throttle position sensor 60 provides controller 12 with an electrical signal corresponding to the desired driver demand.

Referring now to FIG. 2, a block diagram of a method for operating a control system 70 that determines the exhaust gas flange temperature is illustrated. Block 72 represents a steady state temperature map of the exhaust gas temperature that is a function of various engine operating conditions such as air mass, spark timing, exhaust gas recirculation, air/fuel ratio, load and engine speed. Of course, not all of these engine operating parameters need be included to obtain the temperature ($T_{ss}$). The steady state temperature table is determined experimentally for each type of configuration of engine. That is when different geometric configurations of the engine, engine displacement, exhaust system are used a steady state temperature map is determined for each.

Preferably, the steady state temperature table is determined during engine dynamometer testing. As will be evident to those skilled in the art, the engine often operates outside of a steady state condition and therefore the need for determining the exhaust gas temperature at various conditions is evident. That is, the steady state temperature is only one factor of many to be considered. The engine airflow at flange 37 is divided into a first flow or rate 74 and a second flow or rate 76. The two airflows 74, 76 are calculated airflows. As was found, the present invention provides a substantially improved flange temperature exhaust gas prediction.

The first flow 74 is directed to a first order heat transfer model 78 to obtain a first temperature T1. The first order heat transfer model models the heat transfer of the physical engine model. One example of a heat transfer model is:

$$\frac{dT^1}{dT} + \frac{1}{\tau}T^1 = \frac{1}{\tau}T_s \text{ where } \frac{T_{ss}+T1}{2} = T^1 \quad T1 = 2T^1 - T_{ss}$$

The thermal mass of the manifold and exhaust pipes before the catalyst are taken into consideration. Of course, the heat transfer model need only be determined once for a particular engine model and exhaust geometry. Such determinations are well known thermodynamic determinations. The heat transfer model averages the first flange exhaust temperature prediction (New_Ave) at its output. The heat transfer model 78 also has an air mass input 80. The heat transfer of the heat transfer model is dependent on the air mass since the Tau value is dependent on the air mass.

Heat transfer model 78 has a feedback loop 82 having a memory block 84 which signifies the storing of information to the memory 44 for later use. Also, an initial condition box 86 is present in feedback loop 82. Initial condition box 86 signifies the initial operating temperature of the engine. This block provides the model and initial operating temperature to average into an old average input Old_Ave. One example of a running average is:

new_av=old_av*(1−fk)+new_val*fk
where:
fk=Filter constant in a differential equation
new_val=Latest temperature value
tc=Time constant As the engine operates the average temperature (running average) will thus increase as the temperature of the exhaust manifold, exhaust system, and catalyst increases. A first calibration box 88 having the calibration parameter Tau 1 is also an input to model 78. Tau 1, as will be further shown below, is dependent on the air mass and changes in response thereto.

Second flow 76 is a flow that bypasses the first order heat transfer model to provide a second temperature T2 to a mixing model 90. The temperature T2 corresponds to the steady state temperature $T_{ss}$. Mixing model 90 generates a first flange temperature $T_{flange1}$ by modeling the airflow into a bypass portion and heat transfer model portion. The second order characteristic of the temperature of the airflow is modeled more closely by two first order airflows.

The flange exhaust temperature $T_{flange1}$ may be used alone or in combination with a thermocoupled model 92. The thermocouple model 92 is an optional portion of the control system. The thermocouple model 92 allows verification of the exhaust gas temperature at the flange. By modeling the thermocouple, the output of model 92 should correspond directly to an actual thermocouple on the vehicle during testing. Thermocouple model 92 has an air mass input 94 because the thermocouple model on Tau 2 input 93 is dependent on the air mass in a similar manner to that of heat transfer model 78. In addition, a feedback loop 96 including memory 98 that stores values into memory and an initial condition block 100. The initial condition block is coupled to an Old_Avg input to model 92. The output of thermocouple model 96 provides a second flange temperature $T_{flange2}$ which is the output of the control system 70 when a thermocouple is taken into consideration. One model is given by the formula:

$$T_{flange2} = T_{flange1} + \tau_2 \frac{dT_{flange1}}{dt}$$

where $\tau_2$, in general is a function of the exhaust flow rate and thermocouple size, is the temperature of the thermocouple junction, and the output of the mixing model and $T_{flange2}$ is the temperature of the exhaust gas at the output of the model.

Referring now to FIG. 3, mixing model 90 is illustrated in further detail. Mixing model 90 receives the temperature T1 from heat transfer model 78 and temperature T2 from bypass loop 76. A constant block 102 which is coupled to an air mass (AM) input 104 is coupled to temperature T1 through a multiplier block 106. A constant block 108, having a constant of 1, is summed with the constant block 102 in addition block 110. The constant actually is provided to an inverting input of addition block 110 so that the output is (1–XG). The output of addition block 110 is multiplied by the temperature $T_2$ at multiplication block 112. The output of multiplication block 112 and multiplication block 106 are summed together in addition block 114 to provide the temperature of the flange. As can be seen, the percentage amount of temperature through the heat transfer model is controlled by the constant block. As was mentioned above, the amount of heat bypassing and passing through the heat transfer model is dependent on the air mass. Thus, as the air mass changes the value X changes as well as will be shown below. The temperature of the $T_{flange1}$ is given by the given by the relation:

$$T_{flange1} = (T1)(XG) + (T2)(1-XG).$$

Figure 4A:
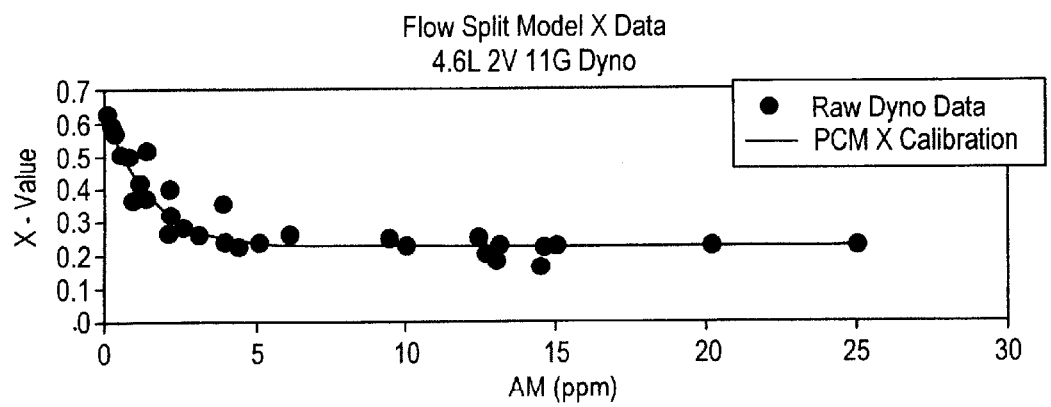
FIG. 4A is a plot of the x calibration versus air mass.

Referring now to FIG. 4A, raw dynamometer data is plotted for the X value shown in block 102 of FIG. 3 versus air mass. Air mass (AM) is measured in pounds per minute (PPM). As can be seen, the calibration data is the curve fitted line that best represents the dynamometer points therein.

Figure 4B:
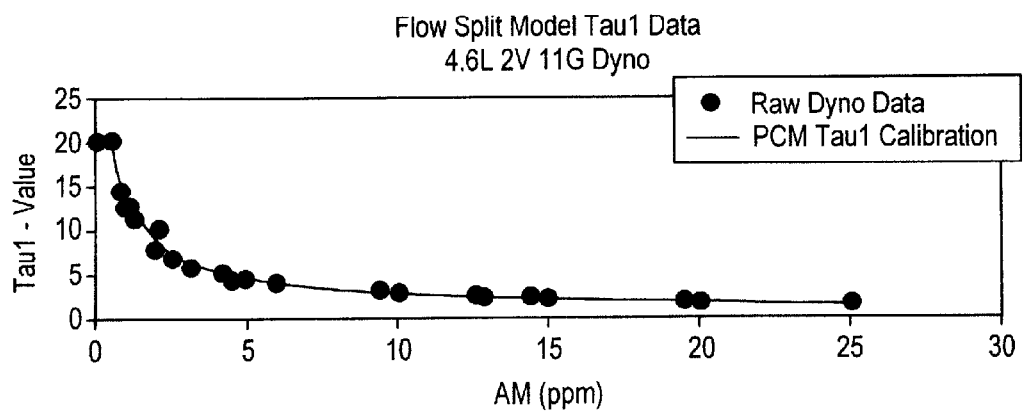
FIG. 4B is a plot of Tau 1 versus air mass.

Referring now to FIG. 4B, the calibration parameter Tau1 is plotted versus air mass. Raw dynamometer data was used to obtain the data which has been curve fitted using the solid line shown therein.

Figure 4C:
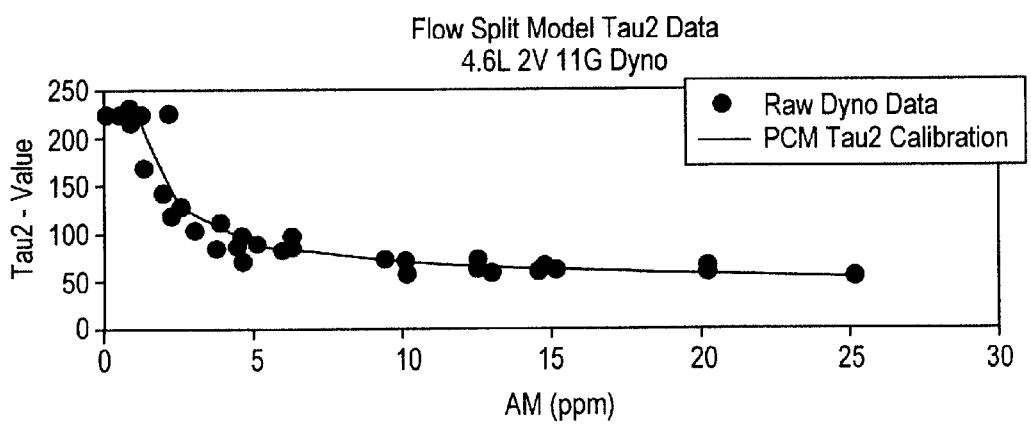
FIG. 4C is a plot of Tau 2 versus air mass.

Referring now to FIG. 4C, the calibration parameter Tau2 is plotted using dynamometer data. A curve fit shown in the solid line is used in the model above. As can be seen in FIGS. 4A–4C, the X, Tau1 and Tau2 values are higher with lower airflow and decrease as the air mass increases. The solid lines represent the output of the model without the need for on-road testing and recalibration normally performed in such determinations.

Figure 5:
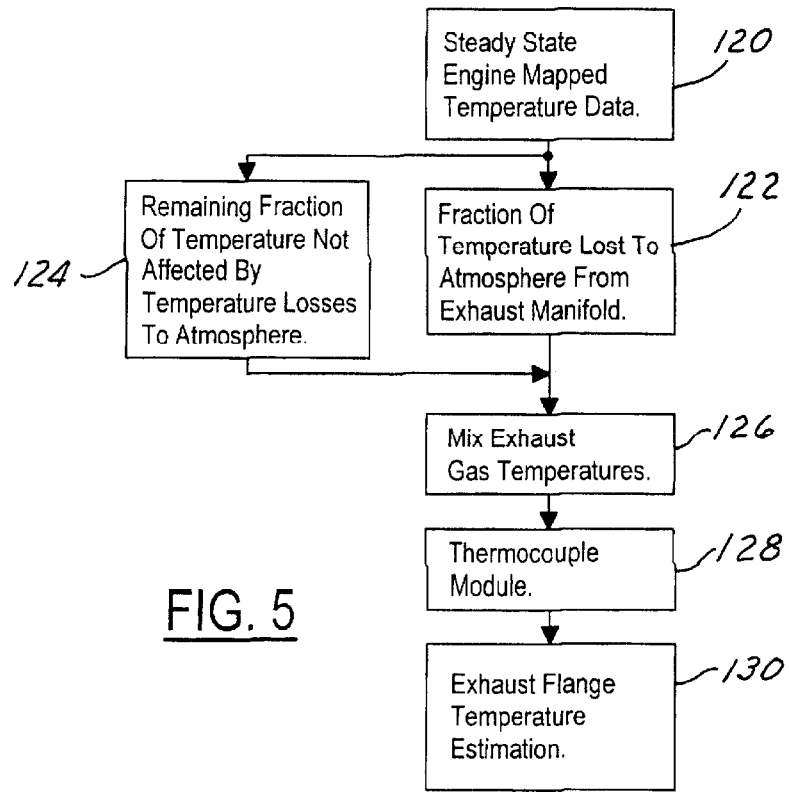
FIG. 5 is a flow chart of the operation of the exhaust gas flange temperature prediction algorithm.

Referring now to FIG. 5, a flow chart illustrating the prediction algorithm according to the present invention is shown. In step 120 the steady state engine temperature data is mapped. As mentioned above, the steady state engine map is preferably performed using dynamometer testing on the particular type of engine. The steady state engine temperature is determined from the map. In step 122, a fraction of the airflow lost to the atmosphere from the exhaust manifold is modeled in the heat transfer model based upon the steady state engine temperature. The remaining portion of the airflow is not affected by temperature losses in block 124. Therefore, this is the steady state temperature. The airflows are combined in block 126. In block 128, a thermocouple may also affect the flange temperature if provided. This block, as mentioned in FIG. 2, is optional. The output of the system in response to the mixed gas and the thermocouple model if so provided is generated in step 130.

The capability of adjusting the heat transfer model and thermocouple model as well as the mixing model according to the air mass of engine yields an improved determination of the temperature of the airflow at the flange. This result may then be used to more accurately determine other downstream temperatures including the catalyst input temperature, the catalyst midbed temperatures, and exhaust gas oxygen sensor temperatures.

While particular embodiments of the invention have been shown and described, numerous variations and alternate embodiments will occur to those skilled in the art. Accordingly, it is intended that the invention be limited only in terms of the appended claims.

We claim:

1. An article of manufacture for determining a catalyst temperature of an engine, the article of manufacture comprising:

a computer storage medium having a computer program encoded therein for determining a first exhaust flow rate and a second exhaust flow rate based on a total flow of said exhaust gases, determining a first temperature of exhaust gases associated with said first exhaust flow rate based on a steady state temperature and an amount of heat transferred from said exhaust gases associated with said first exhaust flow rate to an exhaust system; determining a second temperature of exhaust gases associated with said second exhaust flow rate based on said steady state temperature, and determining said catalyst temperature based on said first temperature and said second temperature.

2. A system for determining a temperature of an emission catalyst communicating with exhaust gases from an engine, said system comprising:

a first sensor generating a signal indicative of a flow rate of said exhaust gases; and, a controller operably connected to said first sensor, said controller being configured to determine a first exhaust flow rate and a second exhaust flow rate based on a the flow rate of said exhaust gases, said controller further configured to determine a first temperature of exhaust gases associated with said first exhaust flow rate based on a steady state temperature and an amount of heat transferred from said exhaust gases associated with said first exhaust flow rate to an exhaust system, said controller further configured to determine a second temperature of exhaust gases associated with said second exhaust flow rate based on said steady state temperature, and said controller further configured to determine said catalytic converter temperature based on said first temperature and said second temperature.

3. The system of claim 2 wherein said first sensor is an air mass sensor disposed in an intake manifold of said engine.

4. A method for determining a temperature of an emission catalyst communicating with exhaust gases from an engine, said method comprising:

determining a first exhaust flow rate and a second exhaust flow rate based on a total flow rate of said exhaust gases;

determining a first temperature of exhaust gases associated with said first exhaust flow rate based on a steady state temperature and an amount of heat transferred from said exhaust gases associated with said first exhaust flow rate to an exhaust system;

determining a second temperature of exhaust gases associated with said second exhaust flow rate based on said steady state temperature; and determining said catalyst temperature based on said first temperature and said second temperature.

5. The method of claim 4 wherein said steady state temperature is indicative of a temperature of said exhaust gases at a steady-state engine operating condition.

6. The method of claim 4 wherein said steady state temperature is determined based on an engine operating parameter.

7. A method as recited in claim 4 further comprising measuring air mass; wherein determining a first temperature of exhaust gases associated with said first exhaust flow rate comprises determining a first temperature of the first flow rate from a heat transfer model and air mass.

8. A method as recited in claim 4 wherein determining a first temperature of exhaust gases associated with said first exhaust flow rate comprises determining a first temperature of the first flow rate from a heat transfer model and a first predetermined temperature calibration.

9. A method as recited in claim 4 wherein determining a first temperature of the first flow rate from a heat transfer model and a thermocouple model comprises determining the first temperature in response to a second predetermined temperature calibration.

10. A method as recited in claim 4 wherein determining said catalyst temperature based on said first temperature and said second temperature comprises proportioning the first temperature and the second temperature as a function of an air mass.

11. A method as recited in claim 4 wherein determining a first temperature of exhaust gases associated with said first exhaust flow rate based on a steady state temperature and an amount of heat transferred from said exhaust gases associated with said first exhaust flow rate to an exhaust system comprises determining a plurality of temperatures over time and wherein the first temperature comprises a running average of the plurality of temperatures.

12. A method as recited in claim 4 further comprising determining a steady state temperature from a calibration table.

13. A method as recited in claim 4 further comprising measuring air mass; wherein determining a first temperature of exhaust gases associated with said first exhaust flow rate comprises determining a first temperature of the first flow rate from a heat transfer model.

14. A method as recited in claim 13 wherein said heat transfer model comprises a first order heat transfer model.

15. A method as recited in claim 4 wherein determining a first temperature of exhaust gases associated with said first exhaust flow rate comprises determining a first temperature of the first flow rate from a heat transfer model and a thermocouple model.

16. A method as recited in claim 15 wherein said thermocouple model comprises a first order heat transfer model.

17. A method for determining a temperature of an exhaust flow comprising:

measuring engine operating conditions including air mass;

determining a steady state temperature as a function of the engine operating conditions;

determining a first temperature of a first flow rate of an exhaust flow from an amount of heat transferred from said exhaust gases associated with said first exhaust flow rate to an exhaust system in response to air mass;

determining a second temperature of a second flow rate of the exhaust flow bypassing a heat transfer model in response to the steady state temperature; and determining a first exhaust temperature from the first temperature and the second temperature as a function of air mass.

18. A method as recited in claim 17 wherein the engine operating conditions include load, spark timing, air fuel ratio, and rotational speed.

19. A method as recited in claim 17 wherein determining a first temperature of the first flow rate comprises determining a first temperature of the first flow rate from a heat transfer model and a first predetermined temperature calibration.

20. A method as recited in claim 17 wherein said heat transfer model comprises a first order heat transfer model.

21. A method as recited in claim 17 wherein determining a first temperature of the first flow rate from a heat transfer model in response to the steady state temperature comprises determining a plurality of temperatures over time and wherein the first temperature comprises a running average of the plurality of temperatures.

22. A method as recited in claim 17 further comprising determining a catalyst temperature in response to the first exhaust temperature.

23. A method as recited in claim 17 further comprising determining a second exhaust temperature in response to a thermocouple model.

24. A method as recited in claim 23 wherein determining a second exhaust temperature in response to a thermocouple model comprises determining a second exhaust temperature in response to a second predetermined temperature calibration.

25. A method as recited in claim 23 wherein said thermocouple model comprises a first order heat transfer model.

* * * * *